United States Patent
Vetterick

Patent Number: 5,576,495
Date of Patent: Nov. 19, 1996

[54] TWO PHASE FLOW METER

[75] Inventor: Richard C. Vetterick, Akron, Ohio

[73] Assignee: The Babcock & Wilcox Company, New Orleans, La.

[21] Appl. No.: 546,881

[22] Filed: Oct. 23, 1995

[51] Int. Cl.⁶ ............................................. G01F 1/74
[52] U.S. Cl. ............................................... 73/861.04
[58] Field of Search ........................ 73/861.04, 861.01, 73/29.01

[56] References Cited

U.S. PATENT DOCUMENTS

| | | | |
|---|---|---|---|
| 2,628,086 | 2/1953 | Cutler | 261/69 |
| 2,703,013 | 3/1955 | Wildhack | 73/357 |
| 3,408,866 | 11/1968 | Gibson et al. | 73/228 |
| 3,689,833 | 9/1972 | Hogg | 324/71 |
| 4,144,754 | 3/1979 | Pitts, Jr. et al. | 73/205 D |
| 4,231,262 | 11/1980 | Boll et al. | 73/861.04 |
| 4,233,842 | 11/1980 | Raemer et al. | 73/861.04 |
| 4,261,196 | 4/1981 | Scheid, Jr. | 73/32 R |
| 4,300,399 | 11/1981 | Kuijpers et al. | 73/861.04 |
| 4,324,143 | 4/1982 | Olson | 73/861.62 |
| 4,397,190 | 8/1983 | Hulin | 73/861.04 |
| 4,501,156 | 2/1985 | Kretschmer et al. | 73/861.04 |
| 4,559,835 | 12/1985 | De Baun | 73/861.66 |
| 4,569,232 | 2/1986 | Kim | 73/861.04 |
| 4,574,643 | 3/1986 | Scott et al. | 73/861.04 |
| 4,604,902 | 8/1986 | Sabin et al. | 73/861.04 |
| 4,776,210 | 10/1988 | Baillie et al. | 73/61.1 R |
| 4,836,032 | 6/1989 | Redus et al. | 73/861.04 |
| 4,856,344 | 8/1989 | Hunt | 73/861.04 |
| 5,036,710 | 8/1991 | King | 73/861.04 |
| 5,351,520 | 10/1994 | Buquet | 73/7 |
| 5,390,547 | 2/1995 | Liu | 73/861.04 |
| 5,396,806 | 3/1995 | Dechens et al. | 73/861.04 |
| 5,400,657 | 3/1995 | Kolpak et al. | 73/861.04 |
| 5,461,930 | 10/1995 | Farchi et al. | 73/861.04 |

Primary Examiner—Richard Chilcot
Assistant Examiner—Jewel Artis
Attorney, Agent, or Firm—Daniel S. Kalka; Robert J. Edwards

[57] ABSTRACT

An apparatus for determining the relative flows of a two phase flow using differential pressure to obtain mass flow having a bend portion for concentrating the dense phase toward an outside of the bend; a perforated plate downstream of the bend for passing the portion of the light phase; a nozzle for channelling the portion of the flow having high density phase toward the center of a venturi throat which is positioned downstream of the perforated plate; and four pressure sensors strategically located for measuring pressure differences at various points in the flow meter.

20 Claims, 3 Drawing Sheets

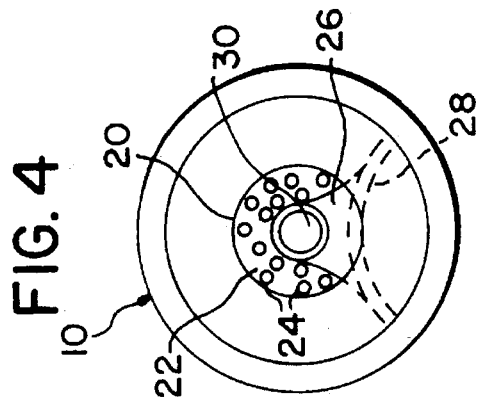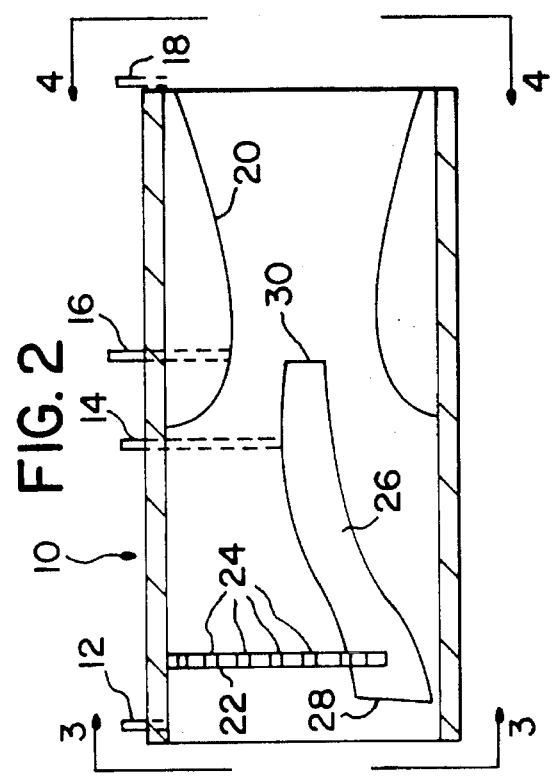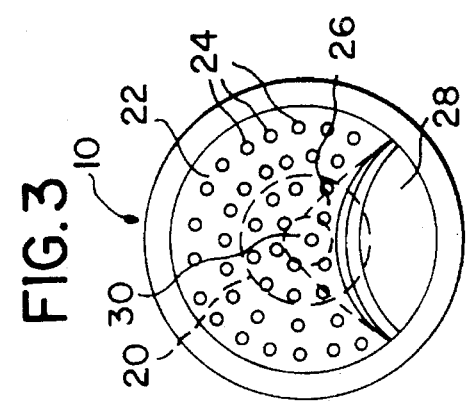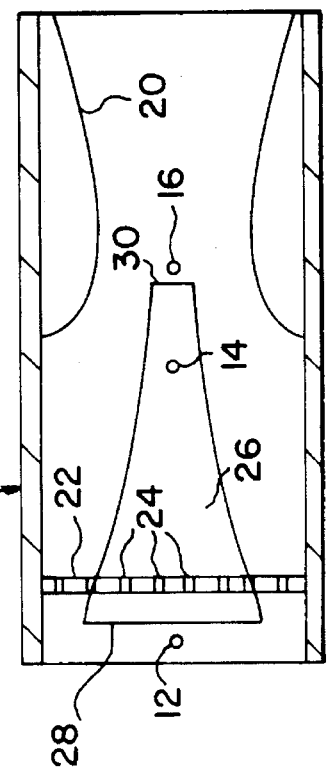

TWO PHASE FLOW METER

BACKGROUND OF THE INVENTION

1. Field of the Invention

The present invention relates in general to a fluid flow measurement arrangement and, more particularly, to an arrangement for measuring a two phase flow.

2. Description of the Related Art

The ability to accurately measure a two phase fluid flow is hampered by problems related to the homogeneity or non-homogeneity of the two phase mixture and the resulting combined density of the mixture. Unsatisfactory attempts to measure two phase flow have been made with magnetic flux meters, pneumatic orifices, ultrasonics and electromagnetic wave instruments.

A flow measuring apparatus having a bend along its conduit is disclosed in U.S. Pat. No. 2,628,086 to Cutler, however no particles in suspension are contemplated as part of the fluid flow. FIG. 2 in U.S. Pat. No. 2,703,013 also shows a bend in a flow conduit, and further, the use of pressure measurements to calculate flow. The use of tapping fluid from one location is described in U.S. Pat. No. 3,689,833, the second location being in the throat of a venturi. The use of curved conduit and flow meter, specifically for taking advantage of centrifugal flow for a multi-phase fluid flow meter is disclosed in U.S. Pat. No. 4,144,754.

The taking of measurements at multiple locations along a flow stream in a flow meter is disclosed in the U.S. Pat. No. 4,231,262.

U.S. Pat. No. 4,261,196 also utilizes a bend in a conduit for multi-phase fluid.

The mass stream of a dusty solid fuel can be measured according to U.S. Pat. No. 4,501,156. This patent also teaches the use of a bend in the conduit of the measuring apparatus as well as the taking of measurements at multiple locations along the flow stream.

U.S. Pat. No. 4,559,835 discloses the use of a partitioned section of a flow conduit in a flow measuring probe.

Presently, there is no known flow meter that can measure the solid phase flow in a two phase (gas and powdered solids, gas and liquid, or liquid and fine solids) medium.

SUMMARY OF THE INVENTION

It is a primary object of the invention to provide a two phase flow meter which is particularly suited for measuring pulverized coal flowing in gas along a conduit or for measuring liquid flowing in gas along a conduit.

In accordance with the invention, a bend is provided in a conduit, a perforated plate downstream of the bend spans the conduit and passes predominately gas having a low concentration of particles or liquid so that through the action of centrifugal force, the particles or liquid become concentrated at the outside of the bend. A nozzle having an inlet end, proximate to the outer portion of the conduit, receives the high particulate or liquid concentration and channels it radially inwardly and in a downstream direction toward a venturi throat. No portion of the perforated plate extends into the nozzle so that the high concentration of dense phase material is injected into the center of the venturi throat. Four pressure sensors are strategically located along the conduit for taking differential pressure measurements which can be used to measure the relative flow of gas and the solid or liquid phase material.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter which a preferred embodiment of the invention is illustrated.

BRIEF DESCRIPTION OF THE DRAWINGS

In the drawings:

FIG. 2 is an elevational sectional view of the invention;

FIG. 3 is an end view taken along line 3—3 of FIG. 2

FIG. 4 is an end view taken along line 4—4 of FIG. 2;

FIG. 5 is a top sectional view; and

DESCRIPTION OF THE PREFERRED EMBODIMENTS

Figure 1:
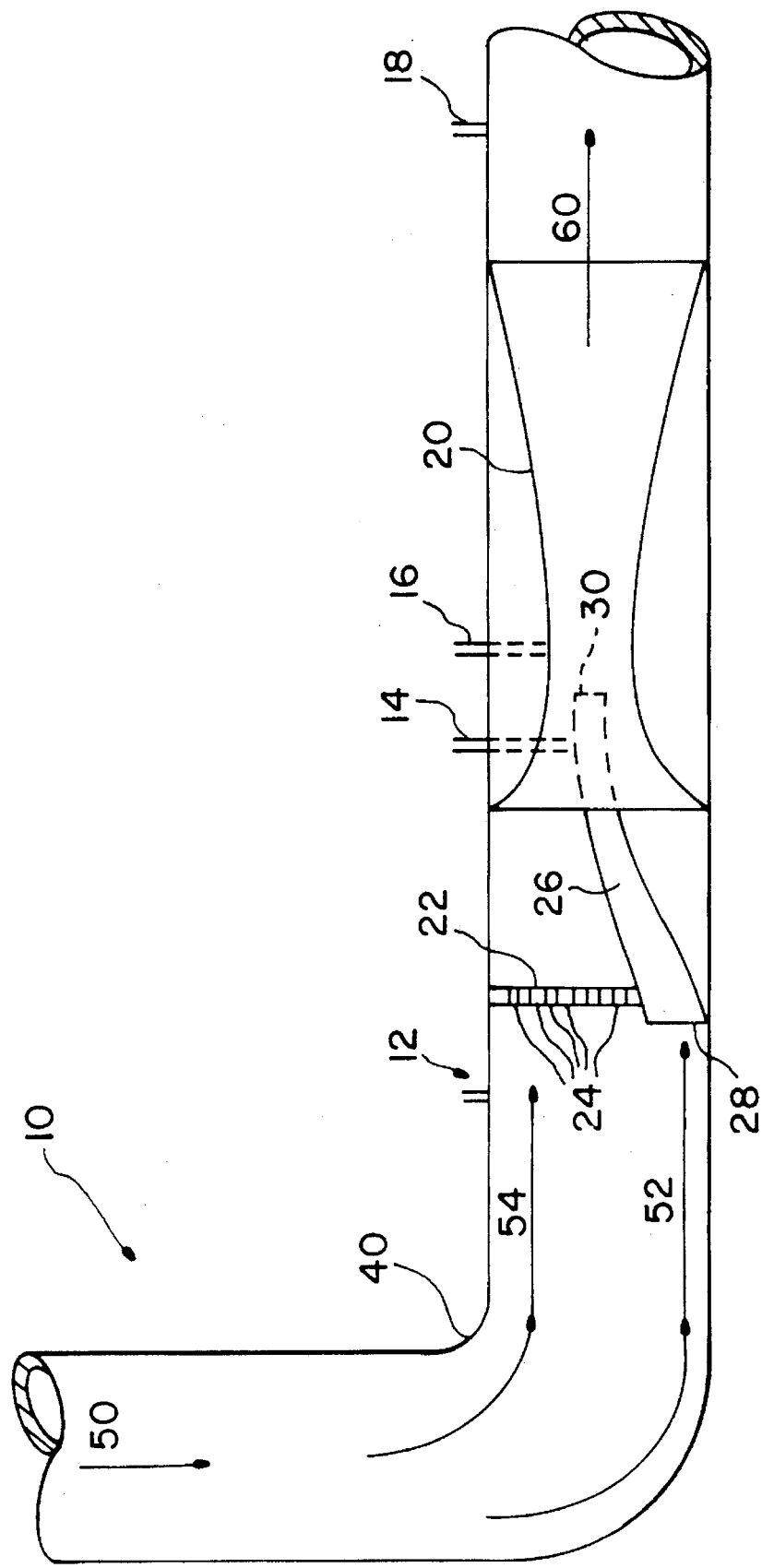
FIG. 1 is a schematic view illustrating the present invention.

Turning to the drawings wherein like reference numerals are used to indicate the same or similar features throughout the several views, FIG. 1 shows an enlarged section of pipe generally designated 10. A two phase fluid flow 50 enters the pipe 10 at the upstream end and passes through a bend 40. The two phase fluid is essentially separated into two distinct phases, a dense or solid (liquid) phase flow 52 and a light or fluid gas phase flow 54. The dense phase flow 52 separates to the external side of the bend 40 in the pipe 10 due to centrifugal forces while the light phase flow 54 continues through the pipe near the inside of the bend 40.

Once the flows 52 and 54 pass bend 40, a pressure measurement is taken at an upstream measurement point 12 by a pressure gauge (not shown). Located adjacent the bend 40 is perforated plate 22 having a plurality of perforations 24 therethrough and which is situated on top of nozzle 26 inside the pipe 10. Nozzle 26 has nozzle inlet 28 through which the dense phase flow 52 is directed. Perforated plate 22 is designed to provide sufficient pressure drop to induce the dense phase flow 52 flow forward through nozzle 26. The light phase flow 54 passes through the multiplicity of perforations 24 of perforated plate 22.

The two flows 52 and 54 then pass into the next section of pipe 10 by two different means. Dense phase flow 52 passes through nozzle 26 to nozzle outlet 30 which is located advantageously along the center line of a venturi tube 20. A second pressure gauge (not shown) connected to nozzle measurement point 14 measures the pressure adjacent the nozzle outlet 30, while venturi pressure point 16 has a third pressure gauge (not shown) connected to it to measure the pressure at the high velocity throat. The effect of the venturi tube 20 is to cause a thorough mixing of the separated phase flows 52 and 54 with a minimum amount of resistance into a mixed two phase flow 60 at the exit of the venturi tube 20. The mixed two phase flow 60 then passes by downstream measurement point 18 at which time the fourth pressure measurement is taken with a fourth pressure gauge (not shown).

In FIG. 2 a smaller section of pipe 10 is shown. In this view, the nozzle 26 is shown having an arcuate shape. The nozzle 26 defines a path from the bottom or outside wall of pipe 10 to approximately the center of venturi 20. The nozzle 26 slopes inward from nozzle inlet 28 in an S-shaped curve to a central location at the entrance to venturi 20 and ends at nozzle outlet 30. The locations of the pressure measurement points 12, 14, 16, 18 are shown relative to the nozzle 26 and venturi 20. The perforated plate 22 is positioned slightly to the downstream side of nozzle inlet 28. The plate 22 surrounds nozzle 26 and is securely connected to the walls of pipe 10, leaving only nozzle inlet 28 and perforations 24 as openings to the downstream sections of the pipe 10.

FIG. 3 shows the location of the perforated plate 22 with a multiplicity of perforations 24 around nozzle 26 in more detail. The plate 22 surrounds nozzle 26 and is securely connected to the walls of pipe 10, leaving only nozzle inlet 28 and perforations 24 as openings to the downstream sections of the pipe 10.

FIG. 4 shows the location of nozzle outlet 30 located in the center of the venturi 20. The nozzle 26 tapers from wide opening at nozzle inlet 28 to a smaller diameter opening at nozzle outlet 30.

FIG. 5 shows the taper of the nozzle 26 from the top. Nozzle measurement point 14 is located advantageously inside the nozzle 26 where the flow velocity is maximized by the taper. Venturi measurement point 16 is placed adjacent the nozzle outlet 30 inside venturi 20, where some mixing of the separated flows 52, 54 occurs.

Additionally, perforated plate 22 can be seen spanning the width of pipe 10 over nozzle 26. Upstream measurement point 12 is located in close proximity to plate 22 and nozzle inlet 28 for obtaining a pressure measurement of the recently separated flows 52, 54.

Figure 6:
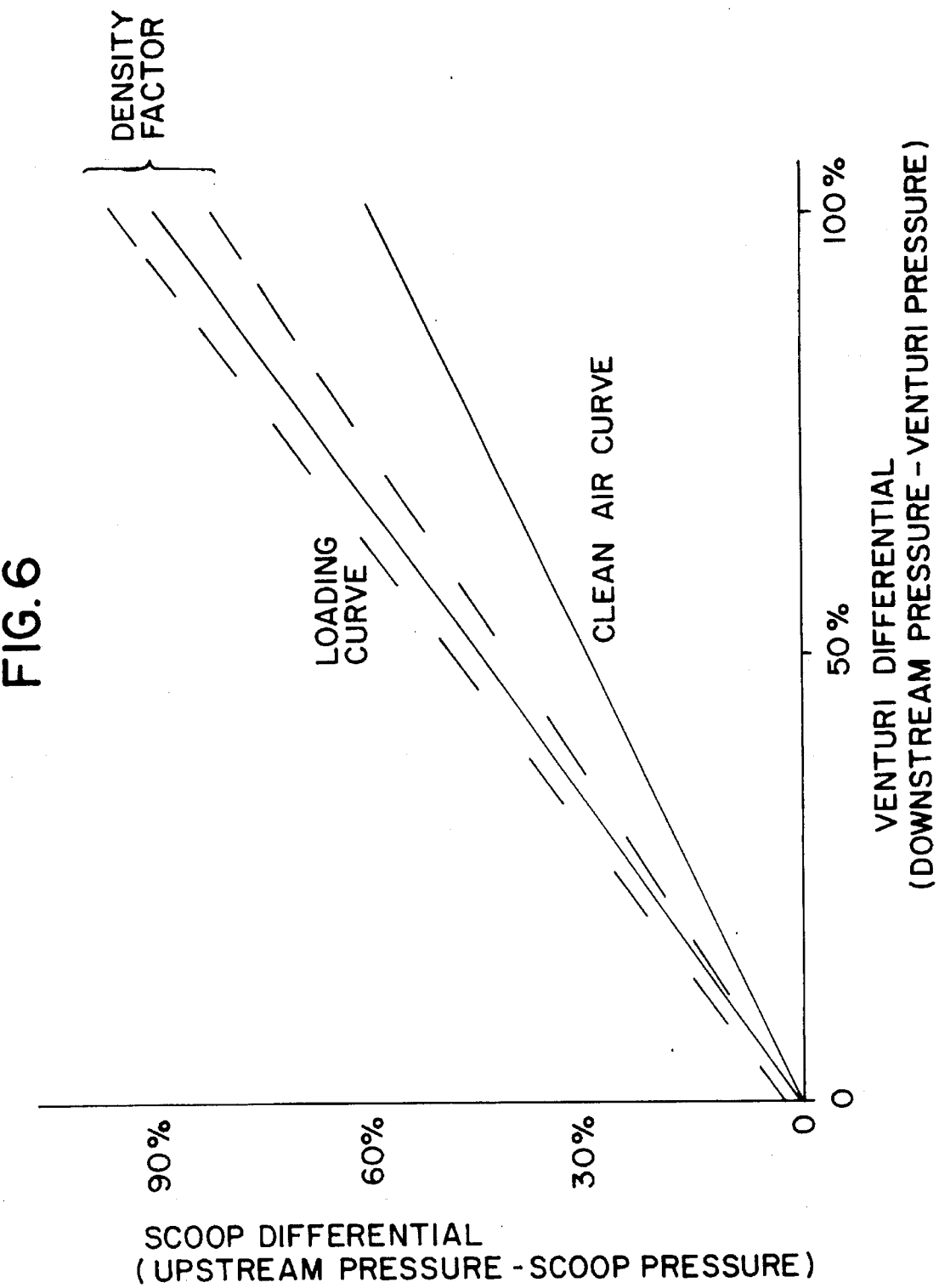
FIG. 6 is a graphic representation of the relative pressure measurements with respect to each other.

FIG. 6 is a graphical representation showing the relationship of the different flows to each other based on the pressure measurements taken within the pipe 10. The mass flow is calculated from the pressure measurements in the following way. The natural static pressure changes through the venturi create pressure differentials that are proportional to the square of the velocity which allow a calculation of mass flow. Static pressure differentials across the venturi nozzle and solid phase nozzle have a compound correlative relationship proportionate to the apparent density of the dense phase flow stream. The stream relationship of the differentials can be plotted as shown in the graph to show a dense phase and light phase flow relationship. By calibrating these differentials against known mass flow quantities they can subsequentially be used to obtain a relative flow measurement of each of the separate phase flows. Referring to the graph shown in FIG. 6, the venturi differential down-stream pressure reading minus venturi tube pressure reading would be calibrated to represent the light phase flow. The differential upstream pressure measurement minus the nozzle pressure measurement would represent gas and solid phase flow. Then by plotting the venturi differential against the nozzle differential, a relative index of solid phase flow may be established.

This arrangement of pressure measurement points and components within the pipe are especially useful for determining the phase flows when the two phases 52, 54 are a gas and a powdered solid or gas and liquid.

The invention can be used in conventional furnaces utilizing pulverized coal for fuel. The pipe 10 represents one of the pulverized coal fuel pipes that supply burners. The fuel pipes use primary air to convey pulverized coal to the burners.

This invention can also be used in natural occuring petroleum feed staoks when gas and liquid phase flow together.

In pipe 10 the bend 40 and plate 22 separate the combined flow of primary air and coal into light and dense phases 54, 52, respectively. The two phases then flow through their respective paths and are recombined in the venturi 20 to continue on to the burner as combined flow 60.

While the primary air and pulverized coal flow through pipe section 10, the four pressure measurements are taken at measurement points 12, 14, 16, 18 by connected gauges. Using the four measurements, the relative flow of coal through the pipes can be determined, allowing better control of the system.

Also, the present invention may be easily retrofit in existing supply lines having a 90 degree bend by adding flanges to the pipe section shown in FIGS. 2 and 5. The flanges are fastened to mating flanges in a pipe or supply line that has a section removed. Alternatively, the pipe section shown in FIGS. 2 and 5 may be welded in place without flanges in a line that has a portion removed downstream a 90 degree bend.

While a specific embodiment of the invention has been shown and described in detail to illustrate the application of the principles of the invention, it will be understood that the invention may be embodied otherwise without departing from such principles.

I claim:

1. An apparatus for determining the relative flows of a two phase flow through a pipe having a longitudinal axis, an upstream end and a downstream end, and means for providing a two phase flow to the upstream end of the pipe, comprising:

means for substantially separating the two phase fluid flow into a dense phase and a light phase inside the pipe adjacent the upstream end;

first means for transporting the dense phase separately through a first section of the pipe to a second section of the pipe downstream of the first section;

second means for transporting the light phase separately through the first section of the pipe to the second section of the pipe downstream of the first section;

means for thoroughly mixing the dense phase and the light phase in the second section of the pipe; and four pressure measurement devices connected to at least four different points within said pipe to obtain four different pressure measurements which can be used to determine the rate of flow of each of the dense phase and light phase through the sections of the pipe.

2. An apparatus according to claim 1, wherein the means for separating the two phase fluid flow comprises a bend in the pipe, oriented to be capable of taking advantage of centrifugal forces to force the dense phase toward an external wall of the pipe and allow the light phase to continue freely through the bend; and a plate having a multiplicity of perforations sized to provide sufficient pressure drop to induce the dense flow to flow forward through a bypass nozzle, said plate being perpendicular to the longitudinal axis of the pipe, and located adjacent the first transporting means, and being of a size and shape so not to obstruct the first transporting means for the dense phase.

3. An apparatus according to claim 2, wherein the first transporting means comprises an elongated nozzle defining a hollow channel for transporting the dense phase from adjacent the external wall to a nozzle outlet substantially on the longitudinal axis of the pipe in the second section of the pipe.

4. An apparatus according to claim 3, wherein the mixing means comprises a Venturi tube having a longitudinal axis oriented parallel to the longitudinal axis of the pipe, located within the second section of the pipe, said nozzle outlet being located along the center line of the Venturi tube.

5. An apparatus according to claim 4, wherein the four pressure measurement points are located one point at the upstream end of the pipe essentially adjacent the bend, the second point substantially adjacent the nozzle outlet, the third point in the interior of the Venturi tube, and the fourth point adjacent the downstream end of the pipe.

6. An apparatus according to claim 1, wherein the first transporting means comprises an elongated nozzle defining a hollow channel for transporting the dense phase to a nozzle outlet substantially on the longitudinal axis of the pipe in the second section of the pipe.

7. A two phase flow meter according to claim 6, wherein the mixing means comprises a Venturi tube having a longitudinal axis oriented parallel to the longitudinal axis of the pipe, located within the second section of the pipe, said nozzle outlet being located along the center line of the Venturi tube.

8. A two phase flow meter according to claim 7, wherein the means for separating the two phase fluid flow comprises a bend in the pipe, oriented to be capable of taking advantage of centrifical forces to force the dense phase toward the external wall of the pipe bend and allow the light phase to continue freely through the bend; and a plate having a multiplicity of perforations sized to provide sufficient pressure drop to induce the dense flow to flow forward through a bypass nozzle, said plate being perpendicular to the longitudinal axis of the pipe, and located adjacent the first transporting means, and being of a size and shape so not to obstruct the first transporting means for the dense phase.

9. A two phase flow meter according to claim 8, wherein the four pressure measurement points are located one point at the upstream end of the pipe essentially adjacent the bend, the second point substantially adjacent the nozzle outlet, the third point in the interior of the Venturi tube, and the fourth point adjacent the downstream end.

10. An apparatus according to claim 9, wherein the dense phase comprises a powdered solid or liquid.

11. An apparatus according to claim 10, wherein the light phase comprises a gas or liquid.

12. An apparatus according to claim 9, wherein the dense phase is pulverized coal and the light phase is air.

13. An apparatus according to claim 12, wherein the dense phase is petroleum liquids and the light phase is natural gas.

14. An apparatus according to claim 13, wherein the dense phase is sand and the light phase is water.

15. A two phase flow meter according to claim 1, wherein four of the pressure measurement points are located one point at the upstream end of the pipe, a second point substantially adjacent the first means for transporting, a third point in the second section of the pipe, and a fourth point adjacent the downstream end of the pipe.

16. An apparatus according to claim 15, wherein the dense phase comprises a powdered solid or heavy liquid.

17. An apparatus according to claim 16, wherein the light phase comprises a gas or light liquid.

18. An apparatus according to claim 17, wherein the dense phase is pulverized coal and the light phase is air.

19. An apparatus according to claim 17, wherein the dense phase is petroleum liquids and the light phase is natural gas.

20. An apparatus according to claim 17, wherein the dense phase is sand and the light phase is water.

* * * * *